(12) United States Patent
Davis et al.

(10) Patent No.: US 8,996,194 B2
(45) Date of Patent: Mar. 31, 2015

(54) VEHICLE MOUNT COMPUTER WITH CONFIGURABLE IGNITION SWITCH BEHAVIOR

(75) Inventors: Brett A. Davis, Suwanee, GA (US); Terry Jendon, Atlanta, GA (US); Michael W. Holladay, Acworth, GA (US); Alison E. Veazey, Stone Mountain, GA (US)

(73) Assignee: EMS Technologies, Inc., Norcross, GA (US)

( * ) Notice: Subject to any disclaimer, the term of this patent is extended or adjusted under 35 U.S.C. 154(b) by 649 days.

(21) Appl. No.: 12/983,611

(22) Filed: Jan. 3, 2011

(65) Prior Publication Data

US 2012/0173038 A1    Jul. 5, 2012

(51) Int. Cl.
G06F 7/00      (2006.01)
G06F 17/00     (2006.01)
G06F 1/32      (2006.01)
G06F 9/44      (2006.01)

(52) U.S. Cl.
CPC ............ *G06F 1/3206* (2013.01); *G06F 9/4418* (2013.01)
USPC ........................................................... 701/1

(58) Field of Classification Search
USPC .............. 701/1, 36; 307/9.1, 10.1, 10.6–10.7; 414/349, 679
See application file for complete search history.

(56) References Cited

U.S. PATENT DOCUMENTS

| | | |
|---|---|---|
| 6,598,168 B1 | 7/2003 | Chen |
| 2006/0173586 A1* | 8/2006 | Swanson .......................... 701/1 |
| 2008/0180676 A1 | 7/2008 | Tsai |
| 2008/0301481 A1 | 12/2008 | Cheng |

OTHER PUBLICATIONS

Jul. 6, 2012 European Search Report in European Application No. 11196084.5.
"How to Change Your Laptop's Power Button Functions in Windows XP", May 21, 2009, http://www.dummies.com/how-to/content/how-to-change-your-laptops-power-button-functions0.navId-323049.html.
Aug. 7, 2012 Communication pursuant to Article 94(3) EPC in European Application No. 11 196 084.5-2212.

* cited by examiner

*Primary Examiner* — Yonel Beaulieu
(74) *Attorney, Agent, or Firm* — Additon, Higgins & Pendleton, P.A.

(57) ABSTRACT

A vehicle mount computer having a configurable behavior controlled by a vehicle's ignition switch. A user can configure the computer to perform an action, switch modes, or execute a software application in response to the ignition switch being pressed or the position of the ignition switch being adjusted. For example, the computer can be configured to switch to a standby mode or hibernation mode, shutdown, prompt the user to select an action, or do nothing in response to the ignition switch being placed in an off position. The ignition switch can be electrically coupled to an input of the computer so that the computer's operating system or another application can monitor the status of the ignition switch. The operating system or application can cause the computer to perform the configured response upon detecting a change in the ignition switch's position or an actuation of the ignition switch.

27 Claims, 5 Drawing Sheets

VEHICLE MOUNT COMPUTER WITH CONFIGURABLE IGNITION SWITCH BEHAVIOR

TECHNICAL FIELD

The invention relates generally to vehicle mounted computer systems, and more particularly to a vehicle mounted computer system having user-configurable behavior controlled by the vehicle's ignition switch.

BACKGROUND

Computer terminals are often mounted on vehicles in warehouses, manufacturing facilities, and other workplaces to collect and display data. For example, vehicle mount computers are commonly found on forklift trucks and other utility vehicles. Vehicle mount computers generally include one or more user interfaces, such as a touch screen display and a keyboard or keypad. Many vehicle mount computers also include a wireless radio for communicating with a remote device, such as another computer or server.

Vehicle mount computers are typically connected to the vehicle's battery to receive supply power. Conventional vehicle mount computers include a power switch or button that an operator can manipulate to turn the vehicle mount computer on and off. Often times, operators leave the vehicle without turning the computer off. For example, an operator may shut down the vehicle at the end of the day, but forget to turn off the vehicle mount computer. This can drain the battery and render the vehicle unusable for the next operator or the next work shift. Furthermore, operators often forget to log out of vehicle mount computers at the conclusion of their work shift. This can allow unauthorized users access to the vehicle mount computer and possibly to a network that the vehicle mount computer is connected to. In addition, the vehicle mount computer's operating system may require an operator to log in again after a certain amount of idle time. This can prevent other operators from logging into the locked computer until an administrator can unlock the computer.

Some organizations' computer administrators prefer that the computers they are responsible for are placed into a certain state when the computer is not in use. For example, a computer administrator may request that users log off of their computers so that updates to applications and network security can be performed. However, many computer users fail to abide by these preferences causing a nuisance to the administrators.

SUMMARY

The present invention provides methods and systems for controlling a computer by way of a vehicle's ignition switch. The computer can be mounted to or otherwise installed on a vehicle, such as a forklift truck or utility vehicle. The vehicle's ignition switch can be logically coupled as an input to the computer so that the computer can detect or receive an indication of the ignition switch's position. For example, the ignition switch can be electrically coupled to the computer's power button such that the computer's operating system detects ignition switch position changes similar to detecting power button depressions.

The computer can be configured by a user such as an operator or computer administrator to perform an action, switch to a different mode, log off the current user, execute a software application, or transmit data to another computer or device in response to the ignition switch being pressed or the position of the ignition switch being adjusted. For example, the computer can be configured to switch to a standby mode, switch to a hibernation mode, shutdown, prompt the operator to select an action, execute an application, or do nothing in response to the ignition switch being placed in an off position or being depressed while the computer is in an active mode. The computer also may be configured to switch from a non-active mode to the active mode in response to the ignition switch being turned on or pressed.

One aspect of the present invention provides a method for performing an action with a vehicle mount computer. A user interface of the vehicle mount computer can receive user input specifying an action for the vehicle mount computer to perform automatically in response to an ignition switch of a vehicle switching from a first position to a second position. The vehicle mount computer can receive an electrical signal indicating that the ignition switch has switched from the first position to the second position. The vehicle mount computer can perform the specified action in response to receiving the electrical signal.

Another aspect of the present invention provides a computer program product. The computer program product can include a computer-readable medium having computer-readable program code embodied therein for causing a vehicle mount computer to perform an action. The computer-readable medium can include computer-readable program code for receiving, via a user interface of the vehicle mount computer, user input specifying an action for the computer to perform automatically in response to an ignition switch of a vehicle switching from a first position to a second position; computer-readable program code for receiving a signal indicating that the ignition switch has switched from the first position to the second position; and computer-readable program code for causing the specified action to be performed in response to receiving the signal.

Yet another aspect of the present invention provides a vehicle mountable computer system. The vehicle mountable computer system can include a user interface for receiving a user input specifying an action for the vehicle mount computer system to perform automatically in response to an ignition switch of a vehicle switching from a first position to a second position. An input of the vehicle mountable computer can receive an electrical signal indicating that the ignition switch has switched from the first position to the second position. An application module logically coupled to the input can cause the vehicle mount computer to perform the specified action in response to receiving the electrical signal.

Yet another aspect of the present invention provides a system that includes a vehicle and a computer mounted thereon. The vehicle can include an ignition switch for selectively activating and deactivating the vehicle. The computer can include a user interface for receiving user input specifying an action for the computer to perform automatically in response to the ignition switch being switched to a certain position. The computer also can include an input electrically coupled to the ignition switch to receive an electrical signal indicating that the ignition switch has switched to the certain position. An application module of the computer can cause the computer to perform the specified action in response to receiving the electrical signal.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles.

DETAILED DESCRIPTION OF EXEMPLARY EMBODIMENTS

Figure 1:
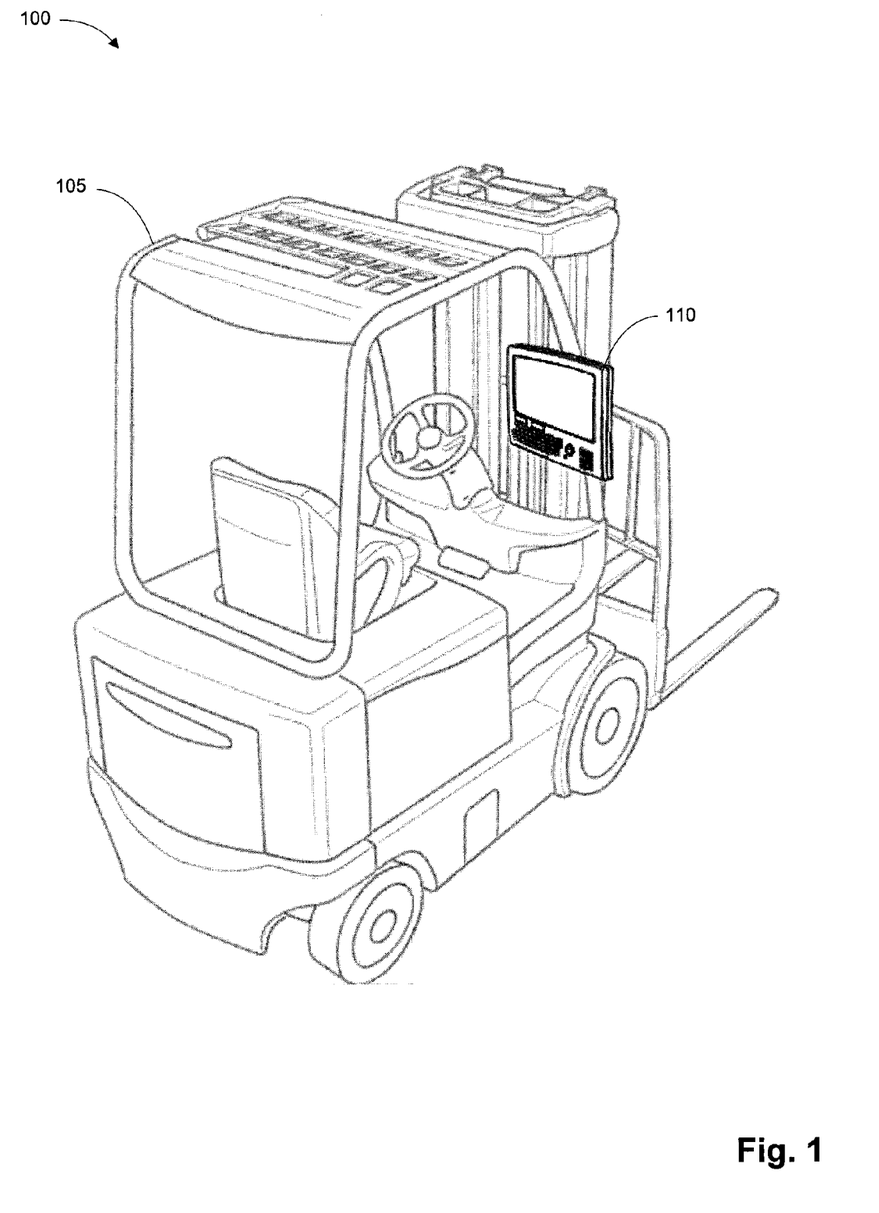
FIG. 1 depicts an operating environment for a vehicle mount computer, in accordance with certain exemplary embodiments.

Referring now to the figures, in which like numerals represent like (but not necessarily identical) elements throughout the figures, exemplary embodiments of the present invention are described in detail. FIG. 1 depicts an operating environment 100 for a vehicle mount computer 110, in accordance with certain exemplary embodiments. Referring to FIG. 1, the operating environment 100 includes a vehicle 105 with the vehicle mount computer 110 mounted thereon. Although the exemplary vehicle 105 is illustrated as a forklift truck, the vehicle mount computer 110 can be mounted to or installed on other types of vehicle, such as a utility truck or cart. The vehicle 105 includes an ignition switch 415 (FIG. 4) for activating and deactivating the vehicle 105. As described in further detail below, the ignition switch 415 can be logically coupled to the vehicle mount computer 110. The vehicle mount computer 110 can be configured to switch from one mode to another or perform certain actions, tasks, or operations in response to the ignition switch 415 being switched from one position to another (rotary switch) or being pressed (pushbutton switch).

Vehicle mount computers 110 are often used in warehouses, manufacturing facilities, and shop floors to collect and display data. For example, vehicle mount computers 110 are commonly used in warehouses to track inventory of products being received and shipped. The vehicle mount computer 110 can be coupled to peripheral devices, such as a bar code scanner, to collect data. As described in further detail below, the vehicle mount computer 110 also can include one or more wireless radios for communicating with another computer or device. An operator can interact with the vehicle mount computer 110 while seated in the vehicle 105. The computer 110 can be mounted in a stationary position inside the vehicle 105 or on a positionable object, such as a swing arm.

Figure 2:
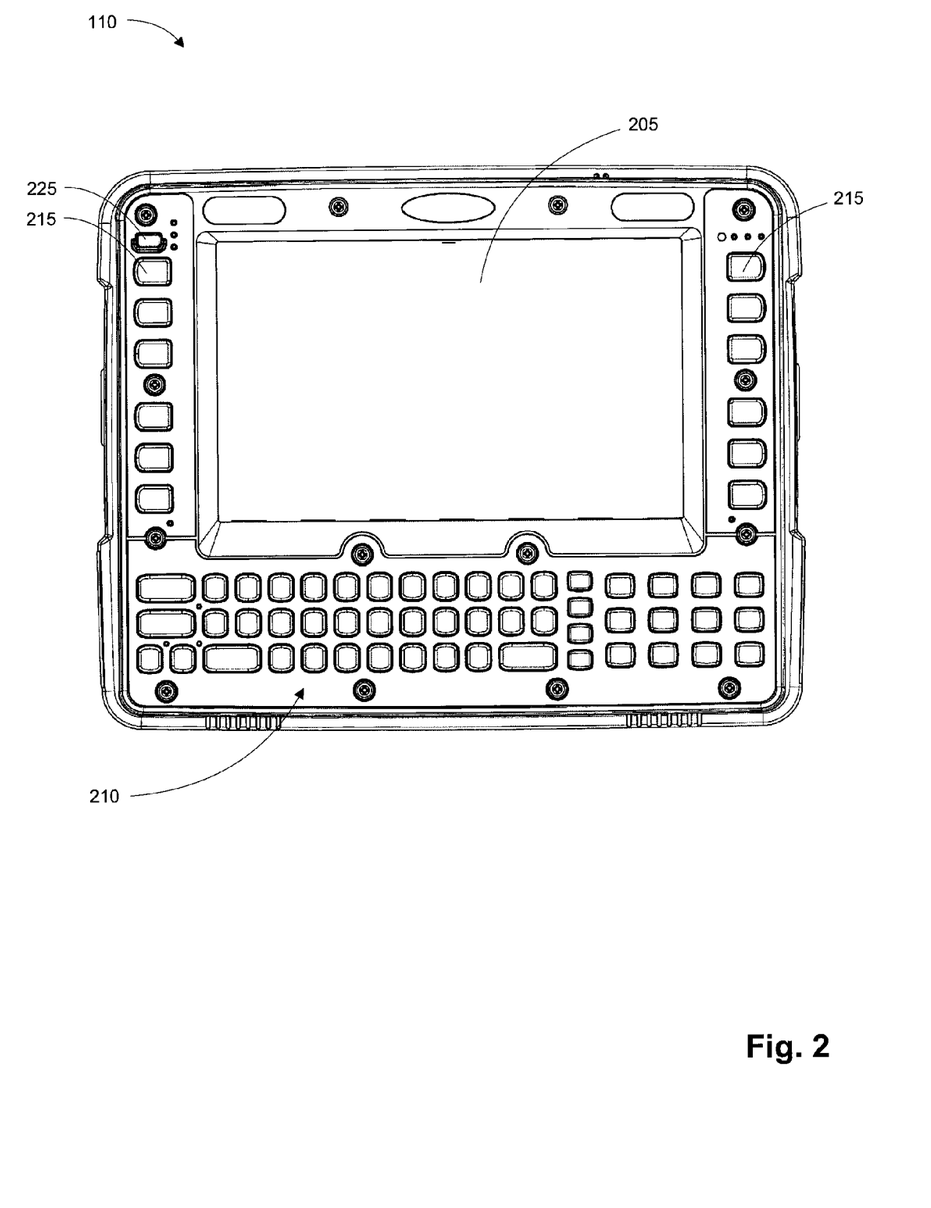
FIG. 2 is a front view of the vehicle mount computer of FIG. 1, in accordance with certain exemplary embodiments.
Figure 3:
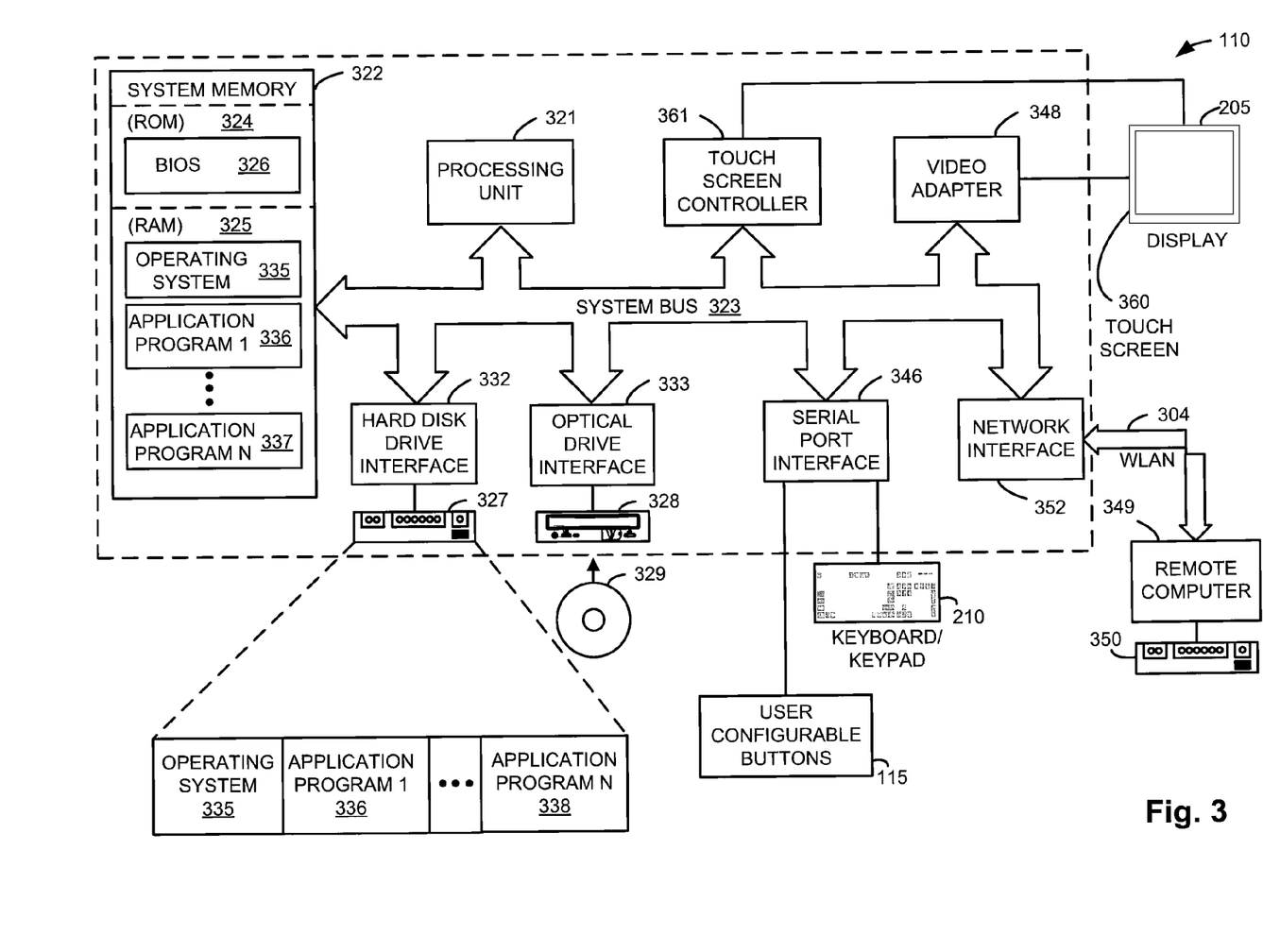
FIG. 3 is a block diagram depicting components of the vehicle mount computer of FIG. 1, in accordance with certain exemplary embodiments.

FIG. 2 is a front view of the vehicle mount computer 110 of FIG. 1, in accordance with certain exemplary embodiments. Referring to FIG. 2, the vehicle mount computer 110 includes several user interfaces. In particular, the exemplary vehicle mount computer 110 includes a display device 205, a keyboard or keypad 210, and user configurable keys 215. In certain exemplary embodiments, the display device 205 includes a touch sensitive screen 360 (FIG. 3). An operator can use the keypad 210, user configurable keys 215, and touch sensitive screen 360 to enter commands and data to the vehicle mount computer 110. The vehicle mount computer 110 also includes a power button 225. An operator can selectively turn the vehicle mount computer 110 on and off by pressing the power button 225. Although not shown, the vehicle mount computer 110 also can include a mouse or other pointing device.

FIG. 3 is a block diagram depicting components of the vehicle mount computer 110 of FIG. 1, in accordance with certain exemplary embodiments. Referring to FIG. 3, the vehicle mount computer 110 includes a processing unit 321, a system memory 322, and a system bus 323 that couples various system components, including the system memory 322, to the processing unit 321. The system bus 323 can include any of several types of bus structures, including a memory bus or memory controller, a peripheral bus, or a local bus, using any of a variety of bus architectures. The system memory 322 includes a read-only memory ("ROM") 324 and a random access memory ("RAM") 325. A basic input/output system ("BIOS") 326 containing the basic routines that help to transfer information between elements within the vehicle mount computer 110, such as during start-up, is stored in the ROM 324.

The vehicle mount computer 110 also includes a hard disk drive 327 for reading from and writing to a hard disk (not shown) and an optical disk drive 328 for reading from or writing to a removable optical disk 329 such as a CD-ROM, compact disk-read/write ("CD/RW"), DVD, or other optical media. The hard disk drive 327 and optical disk drive 328 are connected to the system bus 323 by a hard disk drive interface 332 and an optical disk drive interface 333, respectively. Although the exemplary vehicle mount computer 110 employs a ROM 324, a RAM 325, a hard disk drive 327, and a removable optical disk 329, it should be appreciated by a person of ordinary skill in the art having the benefit of the present disclosure that other types of computer readable media also can be used in the exemplary vehicle mount computer 110. For example, the computer readable media can include any apparatus that can contain, store, communicate, propagate, or transport data for use by or in connection with one or more components of the vehicle mount computer 110, including any electronic, magnetic, optical, electromagnetic, infrared, or semiconductor system (or apparatus or device) or propagation medium, such as magnetic cassettes, flash memory cards, digital video disks, Bernoulli cartridges, and the like. The drives and their associated computer readable media can provide nonvolatile storage of computer-executable instructions, data structures, program modules, and other data for the vehicle mount computer 110.

A number of modules can be stored on the ROM 324, RAM 325, hard disk drive 327 or optical disk 329, including an operating system 335 and various application modules 336-337. Application modules 336-337 can include routines, subroutines, programs, objects, components, data structures, etc., which perform particular tasks or implement particular abstract data types. For example, the application module 336 may be an inventory application for use in collecting and displaying inventory information in a warehouse.

As described in further detail below, the operating system 335 or another application module can be configured by a user to perform certain actions or tasks when the power button 225 is pressed. For example, the operating system 335 can be configured to cause the vehicle mount computer 110 to stand by, hibernate, shut down, do nothing, prompt the operator for what action to perform, start an application module 336-337, or to transmit data (e.g., in a batch) to another computer or device when the power button 225 is pressed and the vehicle mount computer 110 is turned on. The standby mode is a power saving mode where most or all components of the vehicle mount computer 110 switches to a low-power state. The hibernate mode includes storing an image of the vehicle mount computer's current state and shutting almost completely off. The vehicle mount computer 110 can use the stored image to return to that state when returning from the hibernate mode. If configured to prompt the operator for what action to perform, the operating system 335 can present a dialog box including the possible actions for the operator to select from. In certain exemplary embodiments, the operating system 335 is Advanced Configuration and Power Interface ("ACPI") compliant, such as MICROSOFT WINDOWS XP.

The operating system 335 is logically coupled to the power button 225, for example via the system bus 323, to receive a signal indicating whether the power button 225 is pressed. In response to receiving this indication signal, the operating system 335 performs the user-configured action. In certain exemplary embodiments, the operating system 335 includes default settings for responding to the power button 335 being pressed. The user can retain the default settings or adjust the default settings as described below.

An operator can enter commands and information to the vehicle mount computer 110 through the input devices, such as the keypad 210 and the user configurable keys 215. These and other input devices are often connected to the processing unit 321 through a serial port interface 346 that is coupled to the system bus 323, but can be connected by other interfaces, such as a parallel port, game port, or the like.

The display 205 also can be connected to the system bus 323 via an interface, such as a video adapter 348, to receive content for display by the display 205. The exemplary display 205 incorporates a touch sensitive screen 360 coupled to the processing unit 321 by way of a touch screen controller 361. For example, the touch sensitive screen 360 can include resistive, capacitive, surface acoustic wave ("SAW"), infrared ("IR"), strain gauge, dispersive signal technology, acoustic pulse recognition, and optical touch sensing technology, as would be readily understood by a person of ordinary skill in the art having the benefit of the present disclosure. The touch screen controller 361 can determine the location of a user's touch (e.g., with a finger, stylus, pen, or other object) on or near the touch sensitive screen 360. In addition to the display 205, the vehicle mount computer 110 can include other peripheral output devices, such as speakers (not shown).

The vehicle mount computer 110 is configured to operate in a networked environment using logical connections to one or more remote computers 349. The remote computer 349 can be any network device, such as a personal computer, a server, a client, a router, a network PC, a peer device, or other device. While the remote computer 349 typically includes many or all of the elements described above relative to the vehicle mount computer 110, only a memory storage device 350 has been illustrated in FIG. 3 for simplicity. The logical connection depicted in FIG. 3 includes a wireless LAN ("WLAN") 304 that the vehicle mount computer 110 communicates with via an antenna (not shown). In a networked environment, program modules depicted relative to the vehicle mount computer 110, or portions thereof, can be stored in the remote memory storage device 350.

It will be appreciated that the network connection shown in FIG. 3 is exemplary and other means of establishing a communications link between the computers can be used. For example, the vehicle mount computer 110 can communicate via Bluetooth, Zigbee, induction wireless, or any other suitable wireless or wired technology. Moreover, those skilled in the art will appreciate that the vehicle mount computer 110 illustrated in FIG. 3 can have any of several other suitable computer system configurations. For example, the vehicle mount computer 110 may not include certain components, in alternative exemplary embodiments.

Figure 4:
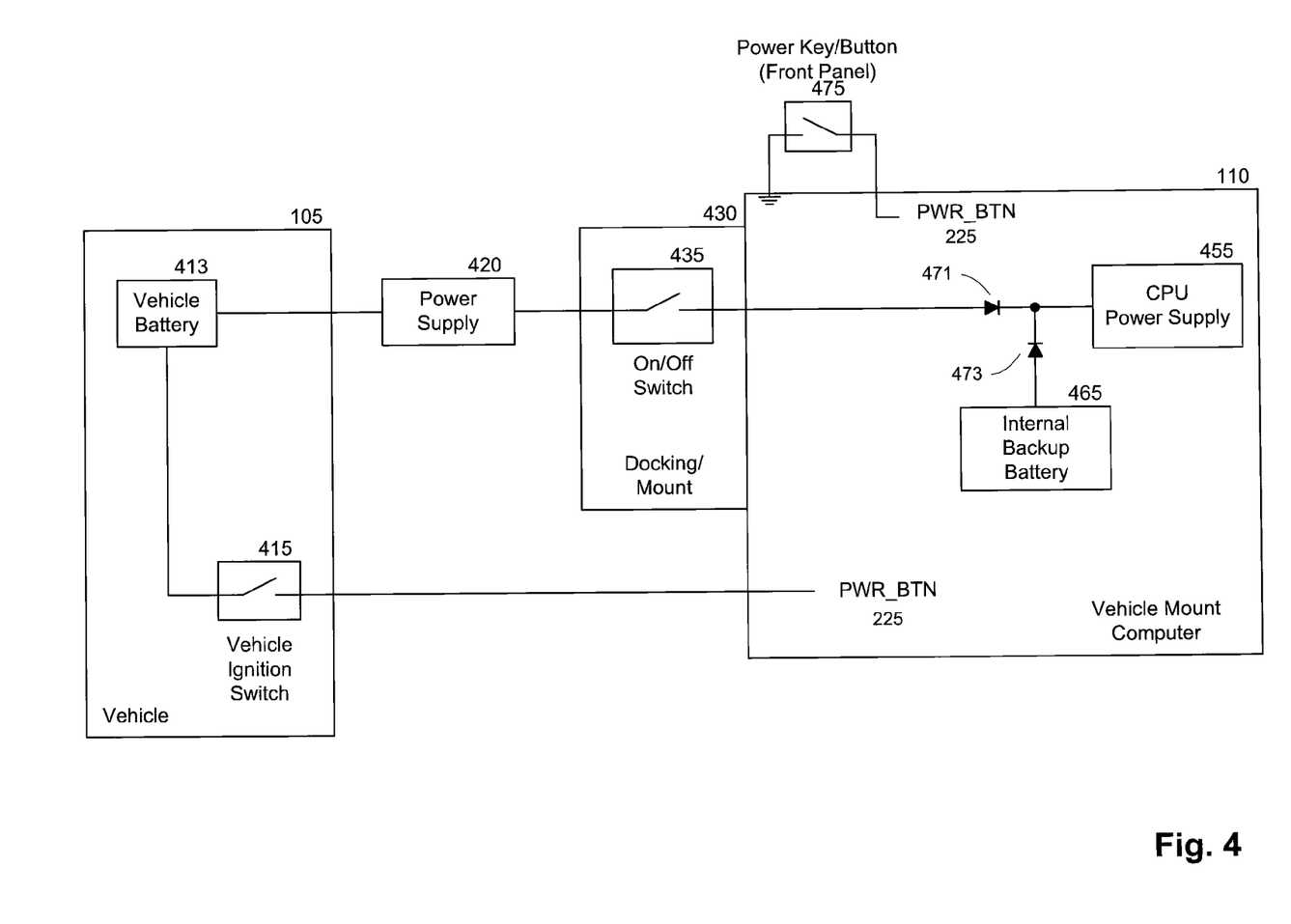
FIG. 4 is a block schematic diagram depicting electrical connections between the vehicle mount computer of FIG. 1 and an ignition switch, in accordance with certain exemplary embodiments.

As briefly discussed above, an operator or other user can configure the operating system 335 (or another program module 336-337) to switch modes or perform one or more actions in response to the power button 225 being pressed. The vehicle mount computer 110 also can be configured such that the operating system 335 performs the one or more actions in response to the vehicle's ignition switch 415 being switched from one position to another or being pressed. In such a configuration, a user can configure the operating system 335 to cause the vehicle mount computer 110 to standby, hibernate, shut down, do nothing, log off the current user, prompt the user for what action to perform, start and/or execute an application module 336-337, or to transmit data to a remote computer 349 in response to the ignition switch 415 being switched from one position to another or being pressed.

The operating system 335 can be configured to perform one or more of the actions based on the ignition switch position and the current state or mode of the vehicle mount computer 110. For example, a user can configure the operating system 335 to switch the vehicle mount computer 110 to a power saving mode (e.g., standby, hibernate, or shutdown) in response to the ignition switch 415 being switched to an off position or being pressed while the vehicle mount computer 110 is in an active mode. In another example, a user can configure the operating system 335 to switch the vehicle mount computer 110 to the active mode in response to the ignition switch 415 being placed in an on position or being pressed while the vehicle mount computer 110 is in an inactive mode. In yet another example, the operating system 335 can be configured to prompt the user for what action to perform or execute and application in response to the ignition switch 415 being switched to an on position or being pressed while the vehicle mount computer 110 is in the active mode. In yet another example, the operating system 335 can be configured to transmit data, such as batch inventory data, to a remote computer 349 in response to the ignition switch 415 being switched to an off position or being pressed while the vehicle 110 is in an active mode. In yet another example, the operating system 335 can be configured to transmit data to a remote computer 349 and then switch to an inactive or power saving mode in response to the ignition switch 415 being switched to an off position or being pressed while the vehicle 110 is in an active mode.

This unique ignition switch configurable behavior enables users or computer administrators to place the vehicle mount computer 110 into a preferred state when the vehicle 105 is turned off. For example, the operating system 335 may cause the vehicle mount computer 110 to switch to a power saving mode (e.g., hibernate, standby, or shutdown) when the vehicle 105 is turned off. Or, the operating system 335 may log off the current user so that another user can log in to the vehicle mount computer 110. This ignition switch control can obviate the need for a user to consciously place the vehicle mount computer 110 into the preferred state, for example at the end of a work shift.

FIG. 4 is a block schematic diagram depicting electrical connections between the vehicle mount computer 110 of FIG. 1 and the ignition switch 415 of the vehicle 105, in accordance with certain exemplary embodiments. Referring to FIG. 4, the vehicle mount computer 110 includes a power supply 455 that provides regulated supply power to the computer's components, such as those illustrated in FIG. 3 and discussed above. For example, the power supply 455 may provide a steady 12 VDC supply to the computer's components.

The vehicle 105 includes a battery 413 that provides power to the vehicle 105 and to the vehicle mount computer 110. The battery 413 is electrically coupled to the computer's power supply 455 via a power supply 420, an on/off switch 435, a diode 471, and one or more electrical conductors. In certain exemplary embodiments, the power supply 420 is a DC-DC isolated power supply that converts the voltage level of the battery to a voltage level suitable for the power supply 455. For example, the power supply 420 may convert a 10 VDC-100 VDC supply provided by the battery 413 to 13.2 VDC for the power supply 455.

An operator can selectively apply or remove power from the vehicle mount computer 110 using the on/off switch 435. The on/off switch 435 can be mounted on the vehicle 105 and is typically mounted proximal to the vehicle mount computer 110. For example, the on/off switch 435 may be mounted on a docking or mounting assembly 430 that also supports the vehicle mount computer 110. In alternative exemplary embodiments, the on/off switch 435 is mounted near the vehicle's ignition switch 415.

The vehicle mount computer 110 also includes a backup battery 465 connected to the computer's power supply 455 via a diode 473 and one or more electrical conductors. The backup battery 465 can provide power to the power supply 465 when external power is not available. For example, if the vehicle's battery 413 is drained, the backup battery 465 may power the vehicle mount computer 110.

The ignition switch 415 is used to activate and deactivate the vehicle 105. In certain exemplary embodiments, the ignition switch 415 includes a first "on" position for activating the vehicle 105 and a second "off" position for deactivating the vehicle 105. An operator can activate the vehicle 105 by inserting a key into the ignition switch 413 and placing the ignition switch 415 in the on position. To deactivate the vehicle 105, the operator can place the ignition switch 415 in the off position. In certain exemplary embodiments, the ignition switch 415 may include additional positions, such as a "start" position for gas powered vehicles and an "accessory" position. The operating system 335 (or other application module 336-337) can be configured by a user to perform an action based on each position and optionally the current mode or state of the vehicle mount computer 110.

In certain alternative exemplary embodiments, the switch 415 can be embodied as another type of switch, such as a pushbutton switch, a slider switch, or a rotary switch to name a few. If the switch 415 is a pushbutton switch or other type of momentary switch, the vehicle 105 may be started and stopped in response to the switch 415 being pressed.

In the illustrated embodiment, the ignition switch 415 is electrically coupled in series with the power button 475 between the battery 413 and the power button input 225 of the vehicle mount computer 110. In such a configuration, the ignition switch 415 can control the power button input 225 to the operating system 335. That is, the operating system 335 can detect the position of the ignition switch 415 similar to detecting inputs from the power button 475. Accordingly, the operating system 335 responds to the position of the ignition switch 415 based on the user configuration. In certain alternative embodiments, the ignition switch 415 is electrically coupled to another input of the vehicle mount computer 110 rather than the power button input 225.

In certain alternative embodiments, the ignition switch 415 is electrically coupled to the power button input 225 in parallel with the power button 475. In such embodiments, an operator can use the ignition switch 415 or the power button 475 to control the vehicle mount computer 110.

In either implementation, the operating system 335 can detect the position or status of the ignition switch 415 and, in response, cause the vehicle mount computer 110 to perform an action, switch between modes of operation, execute an application, do nothing, log off the current user, or prompt the user to select an action. The action performed by the operating system 335 can be configured by a user and also can depend on the current mode or state of the vehicle mount computer 110. For example, if the ignition switch 415 is turned to the on position while the vehicle mount computer 110 is turned off, the operating system 335 can detect the ignition switch's position and cause the vehicle mount computer 110 to turn on. In another example, if the vehicle mount computer 110 is in an active mode and the ignition switch 415 is moved to the off position, the operating system 335 can cause the vehicle mount computer 110 to perform an action or switch to a certain mode of operation, such as the standby mode or hibernation mode.

As shown in FIG. 4, the power button 475 and the power button input 225 are electrically coupled in series to the negative terminal (ground) of the battery 413. In alternative embodiments, the power button 475 and the power button input 225 can be electrically coupled in series to the positive terminal of the battery 413, for example in parallel with an ignition input to the computer terminal 110 that is coupled to the operating system 335. In this manner, the negative terminal of the battery 413 can always be connected to the vehicle mount computer 110 without a switch. The power button 475 and the ignition input can have "always on" logic (if the power supply 420 and the on/off switch 435 are on) that can initiate the configured response of the vehicle mount computer 110 either by the power button 475 or the ignition switch 415.

Figure 5:
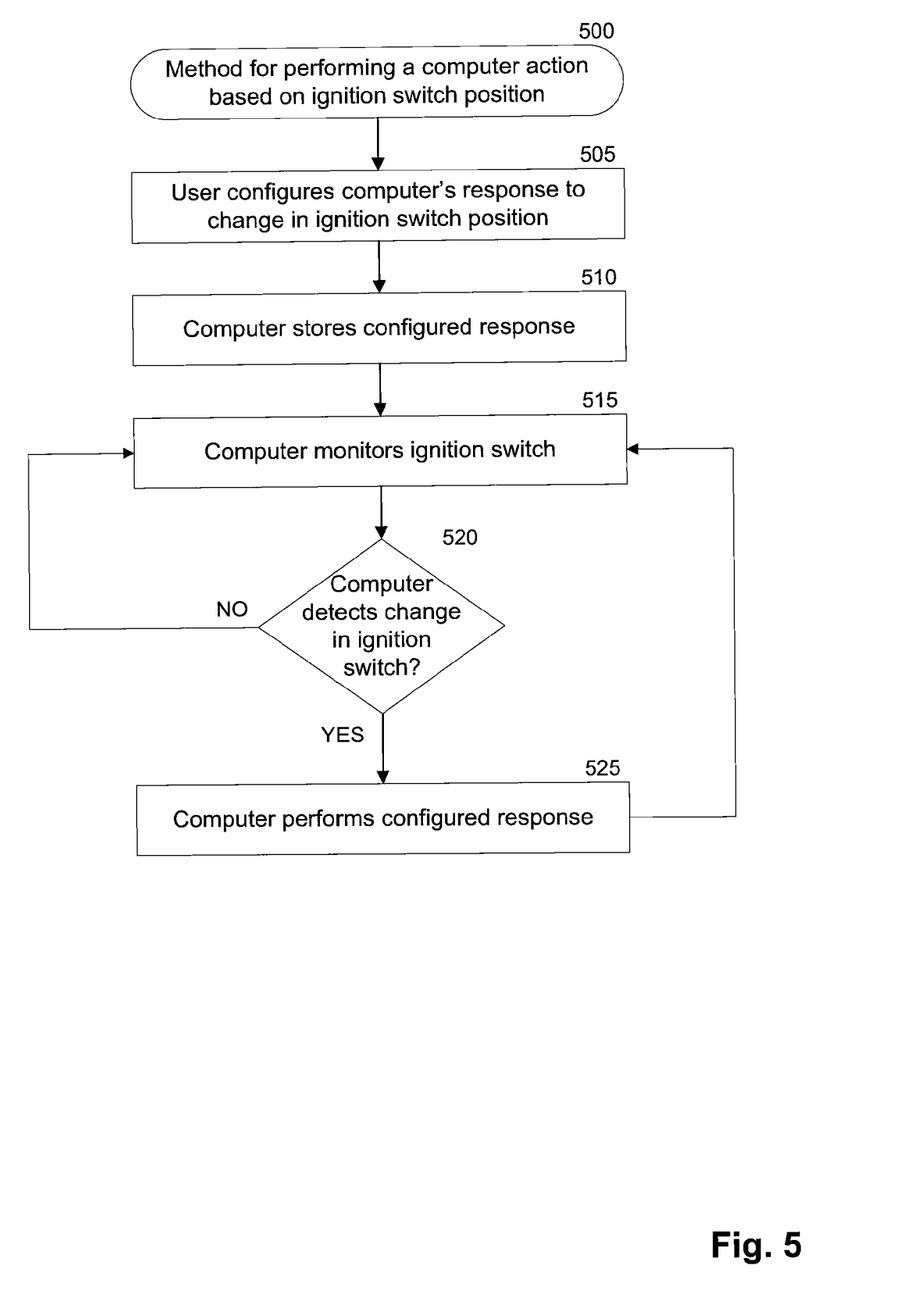
FIG. 5 is a block flow diagram depicting a method for performing a computer action based on the position of a vehicle's ignition switch, in accordance with certain exemplary embodiments.

FIG. 5 is a block flow diagram depicting a method 500 for performing a computer action based on the position of the vehicle's ignition switch 415, in accordance with certain exemplary embodiments. The exemplary method 500 is described in terms of the operating system 335 performing user-configured actions in response to the position of the ignition switch 415. However, another application, such as an Application Programming Interface ("API") logically coupled to the operating system 335 or a power management utility application, may perform the user-configured actions.

Referring to FIGS. 1, 4, and 5, in block 505, a user configures the operating system 335 of the vehicle mount computer 110 to perform one or more actions or procedures, switch to a mode of operation, execute an application module 336-337, or transmit data to a remote computer 349 based on the position of the ignition switch 415. For example, the operating system 335 may be configured to switch to a standby mode, a hibernation mode, or shut down in response to the ignition switch 415 being switched to the off position (or pressed if a momentary switch) while the vehicle mount computer 110 is in an active state. In another example, the operating system 335 may be configured to prompt the user for what to do in response to the ignition switch 415 being switched to the off position (or pressed if a momentary switch) while the vehicle mount computer 110 is in an active state. In yet another example, the operating system 335 may be configured to do nothing start and execute an application module 336-337, or log a current user off of the vehicle mount computer 110, in response to the ignition switch 415 being switched to the off position or pressed while the vehicle mount computer 110 is in an active mode. In yet another example, the operating system 335 can be configured to transmit data, such as batch inventory data, to a remote computer 349 in response to the ignition switch 415 being switched to an off position or being pressed while the vehicle 110 is in an active mode. In yet another example, the operating system 335 can be configured to transmit data to a remote computer 349 and then switch to an inactive or power saving mode in response to the ignition switch 415 being switched to an off position or being pressed while the vehicle 110 is in an active mode.

In certain exemplary embodiments, the user can configure the operating system 335 via a control menu. For example, the operating system 335 may provide a menu having a list of possible actions to perform or modes of operation to switch to in response to the ignition switch 415 being placed in a certain position or pressed. The user can select one or more preferred actions to be performed from the list. In certain exemplary embodiments, the vehicle mount computer 110 includes default actions that are performed based on the position of the ignition switch 415 and optionally based on the current state of the vehicle mount computer 110. The user 110 can customize the vehicle mount computer 110 to perform desirable actions rather than the default actions.

In block 510, the operating system 335 stores the configuration in memory 322. In block 515, the operating system 335 monitors the ignition switch 415. For example, the operating system 335 may monitor the power button input or another input logically coupled to the ignition switch 415. In block 520, the operating system 335 conducts an inquiry to determine whether the position of the ignition switch 415. For example, the operating system 335 can store the current position of the ignition switch 415 periodically. The operating system 415 can compare the current position of the ignition switch 415 to a previously stored position to determine whether the position has changed. If the ignition switch 415 is a pushbutton switch, the operating system 335 can monitor for the ignition switch 415 being pressed. If the operating system 335 determines that the position of the ignition switch 415 has changed (or has been pressed), then the method 500 follows the "YES" branch to block 525. Otherwise, the method 500 follows the "NO" branch to return to block 515 where the operating system 335 continues to monitor the position of the ignition switch 415.

In block 520, the operating system 335 causes the vehicle mount computer 110 to perform the configured action based on the position of the ignition switch and optionally the current mode of the vehicle mount computer 110. For example, if the vehicle mount computer system 110 is not in the active mode, then the configured response may be to switch the vehicle mount computer 110 to the active mode in response to the ignition switch 415 being turned on or pressed. In another example, if the vehicle mount computer 110 is in the active mode, then the configured action may be to switch to a power saving mode. The method 500 returns to block 515 from block 525 to monitor the position of the ignition switch 415.

One of ordinary skill in the art would appreciate that the present invention provides a vehicle mount computer having a configurable behavior controlled by a vehicle's ignition switch. A user can configure the computer to perform an action, switch to a different mode, or execute a software application in response to the ignition switch being pressed or the position of the ignition switch being adjusted. For example, the computer can be configured to switch to a standby mode, hibernation mode, shutdown, prompt the user to select an action, or do nothing in response to the ignition switch being placed in an off position. The ignition switch can be electrically coupled to an input of the computer so that the computer's operating system or another application can monitor the status of the ignition switch. The operating system or application can cause the computer to perform the configured response upon detecting a change in the ignition switch's position or an actuation of the ignition switch.

Although specific embodiments have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A method for performing an action with a vehicle mount computer, comprising:
   receiving, at a user interface of the vehicle mount computer, user input specifying an action for the vehicle mount computer to perform automatically in response to an ignition switch of a vehicle switching from a first position to a second position; and
   receiving, with the vehicle mount computer, an electrical signal indicating that the ignition switch has switched from the first position to the second position,
   wherein the vehicle mount computer performs the specified action in response to receiving the electrical signal; and
   wherein the vehicle mount computer operates in a wireless networked environment using logical connections to one or more remote external computers.

2. The method of claim 1, wherein the vehicle mount computer receives the electrical signal through a port that is electrically connected to the ignition switch via an electrical circuit.

3. The method of claim 1, further comprising storing information in nonvolatile memory of the vehicle mount computer in response to receiving the user input, wherein the stored information configures the vehicle mount computer to perform the specified action in response to receiving the electrical signal.

4. The method of claim 1, wherein the specified action comprises substantially changing power consumption of the vehicle mount computer.

5. The method of claim 1, wherein the first position comprises a position for activating the vehicle and the second position comprises a position for deactivating the vehicle, and wherein the specified action comprises one of switching the vehicle mount computer to a standby mode, switching the vehicle mount computer to a hibernation mode, and removing power from one or more components of the vehicle mount computer.

6. The method of claim 1, wherein the first position comprises a position for activating the vehicle and the second position comprises a position for deactivating the vehicle, and wherein the specified action comprises one of prompting a user to select from a plurality of actions and executing an application.

7. The method of claim 1, wherein the first position comprises a position for deactivating the vehicle and the second position comprises a position for activating the vehicle, and wherein the selected action comprises switching the vehicle mount computer to an active mode.

8. The method of claim 1, wherein the specified action is based on a current mode for the vehicle mount computer.

9. A computer program product, comprising:
a computer-readable medium having computer-readable program code embodied therein for causing a vehicle mount computer to perform an action, the computer-readable medium comprising:
computer-readable program code causing a vehicle mount computer to receive, via a user interface of the vehicle mount computer, user input specifying an action for the computer to perform automatically in response to an ignition switch of a vehicle switching from a first position to a second position;
computer-readable program code causing a vehicle mount computer to receive a signal indicating that the ignition switch has switched from the first position to the second position;
computer-readable program code causing a vehicle mount computer to perform the specified action in response to receiving the signal; and
computer-readable program code causing the vehicle mount computer to operate in a wireless networked environment using logical connections to one or more remote external computers.

10. The computer program product of claim 9, wherein the signal is received through a port of the vehicle mount computer that is electrically connected to the ignition switch via an electrical circuit.

11. The computer program product of claim 9, further comprising computer-readable program code for storing information in nonvolatile memory of the vehicle mount computer in response to receiving the user input, wherein the stored information configures the vehicle mount computer to perform the specified action in response to receiving the signal.

12. The computer program product of claim 9, wherein the specified action comprise substantially changing power consumption of the vehicle mount computer.

13. The computer program product of claim 9, wherein the first position comprises a position for activating the vehicle and the second position comprises a position for deactivating the vehicle, and wherein the specified action comprises one of switching the vehicle mount computer to a standby mode, switching the vehicle computer to a hibernation mode, and removing power from one or more components of the vehicle mount computer.

14. The computer program product of claim 9, wherein the first position comprises a position for activating the vehicle and the second position comprises a position for deactivating the vehicle, and wherein the specified action comprises one of prompting a user to select from a plurality of actions and executing an application.

15. The computer program product of claim 9, wherein the first position comprises a position for deactivating the vehicle and the second position comprises a position for activating the vehicle, and wherein the selected action comprises switching the vehicle mount computer to an active mode.

16. The computer program product of claim 9, wherein the specified action is based on a current mode for the vehicle mount computer.

17. A vehicle mountable computer system, comprising:
a user interface for receiving a user input specifying an action for the vehicle mount computer system to perform automatically in response to an ignition switch of a vehicle switching from a first position to a second position;
an input for receiving an electrical signal indicating that the ignition switch has switched from the first position to the second position; and
an application module logically coupled to the input for causing the vehicle mount computer to perform the specified action in response to receiving the electrical signal;
wherein the vehicle mount computer operates in a wireless networked environment using logical connections to one or more remote external computers.

18. The vehicle mountable computer system of claim 17, wherein the application module comprises an operating system.

19. The vehicle mountable computer system of claim 17, further comprising a second application module for storing information in nonvolatile memory of the vehicle mount computer in response to receiving the user input, wherein the stored information configures the application module to perform the specified action in response to receiving the electrical signal.

20. The vehicle mountable computer system of claim 17, wherein the input comprises a port that is electrically coupled to the ignition switch via an electrical circuit.

21. The vehicle mountable computer system of claim 17, wherein the specified action comprises substantially changing power consumption of the vehicle mount computer system.

22. The vehicle mountable computer system of claim 17, wherein the selected action is based on a current mode for the computer.

23. A system, comprising:
a vehicle comprising an ignition switch for selectively activating and deactivating the vehicle; and
a computer mounted on the vehicle and comprising:
a user interface for receiving user input specifying an action for the computer to perform automatically in response to the ignition switch being switched to a certain position;
an input electrically coupled to the ignition switch to receive an electrical signal indicating that the ignition switch has switched to the certain position;
an application module logically coupled to the input for causing the computer to perform the specified action in response to receiving the electrical signal;
wherein the vehicle mount computer operates in a wireless networked environment using logical connections to one or more remote external computers.

24. The system of claim 23, wherein the computer further comprises a second application module for storing information in nonvolatile memory of the computer in response to receiving the user input, wherein the stored information configures the application module to perform the specified action in response to receiving the electrical signal.

25. The system of claim 23, wherein the input comprises a port that is electrically coupled to the ignition switch via an electrical circuit.

26. The system of claim 23, wherein the specified action comprises substantially changing power consumption of the computer.

27. The system of claim 23, wherein the vehicle comprises a lift truck.

* * * * *